United States Patent [19]
Marchetto

[11] 3,793,084
[45] Feb. 19, 1974

[54] ELECTRODE FOR ELECTROCHEMICAL CELLS WITH GRADUATED CATALYST CONCENTRATION

[75] Inventor: Manfredo Marchetto, Zingonia, Italy

[73] Assignee: Siemens Aktiengesellschaft, Berlin and Munich, Germany

[22] Filed: July 29, 1971

[21] Appl. No.: 167,136

[30] Foreign Application Priority Data

July 30, 1970 Germany ........................... 2037795

[52] U.S. Cl. .......................................... 136/120 FC
[51] Int. Cl. .......................................... H01m 13/00
[58] Field of Search ....... 136/120 FC; 162/128, 138

[56] References Cited

UNITED STATES PATENTS

| | | | |
|---|---|---|---|
| 3,480,538 | 11/1969 | Sturm | 136/120 FC X |
| 3,048,515 | 8/1962 | Dalton | 162/128 X |
| 3,062,700 | 11/1962 | Dalton | 162/138 |
| 3,265,557 | 8/1966 | Fries et al. | 162/138 |
| 3,328,205 | 6/1967 | Barber et al. | 136/120 FC X |

*Primary Examiner*—L. Dewayne Rutledge
*Assistant Examiner*—M. J. Andrews
*Attorney, Agent, or Firm*—Herbert Lerner

[57] ABSTRACT

An electrode, for electrochemical cells, with pulverulent catalyst material and a porous cover layer of fibrous material. The electrode comprises a layer of fibrous material with two sequential semilayers. One of the semilayers comprises fibrous material only and the other of the semilayers comprises fibrous material and pulverulent catalyst. Also described is a method of forming the electrode.

2 Claims, 3 Drawing Figures

11 12 13 14 15

ELECTRODE FOR ELECTROCHEMICAL CELLS WITH GRADUATED CATALYST CONCENTRATION

My invention relates to an electrode for electrochemical cells with pulverulent catalyst material and a porous cover layer of fibrous material and a method for producing said electrode.

U.S. Pat. No. 3,471,336 of v. Sturm et al. described an electrochemical cell with thin electrodes and a porous supporting structure containing electrolyte which impregnates the same. The active electrode in this cell is essentially comprised of pulverulent catalyst material which is passed against said support structure by a net or sieve with good electricity conducting properties. The supporting structure is flexible and contains, at least on one side, an ion-conductive cover layer which, in a saturated state, is gas tight. A suitable cover layer, for example, may be non metallic plates such as asbestos paper, fiber glass paper, foils or cellulose and their derivatives. The placing of a cover layer between the pulverulent catalyst electrode and the supporting structure eliminates the danger of gas penetration from the gas chamber of the electrode into the electrolyte. The nets and sieves serve, primarily, for pressing the catalyst powder against the cover layer or against the supporting structure.

The operation of electrochemical cells with such pulverulent catalyst electrodes may entail difficulties which can be traced to the loose adherence of the catalyst powder upon the cover layer. Thus, for example, when the outer contact pressure is relaxed, the pulverulent catalyst material may separate from the cover layer. This leads, during operation, to current interruptions, in the separated regions. An additional difficulty may occur when the catalyst coating is kept small, for example, in order to reduce costs. Very thin catalyst layers are less easy to handle and at times show non-uniform distribution of catalyst material.

It is an object of the invention to fashion an electrode for electrochemical cells, with pulverulent catalyst material and a porous cover layer of fibrous material, in such a manner that the aforedescribed difficulties will be obviated.

To this end, and in accordance with the invention, two sequential layer type regions are formed in a layer of fibrous material one of the regions consisting only of fibrous material while the other region contains fibrous material as well as the catalyst powder. The region which comprises only fibrous material defines the cover layer and the region containing fibrous material and the catalyst powder, defines the catalyst layer of the electrode according to the invention.

The installation of the catalyst powder into the fibrous material provides a uniform distribution of the catalyst particles. The uniform distribution is also obtained when the catalyst coating is kept low. The fibrous material, moreover, keeps the catalyst powder together and defines thereby a type of support structure for the catalyst material. This affords a very easy and comfortable handling, particularly in very thin electrodes. The fact that the catalyst and cover layer define two sequential layer type regions of a single layer of fibrous material further guarantees reliability that when electrochemical cells, such as fuel cells, are operated using electrodes of the invention, no interferences may occur which would result into peeling off or separation of the catalyst layer from the cover layer.

Electrodes of a fibrous carrier material, which contains a water repellant compound and a metal catalyst, are known from the British Patent 1,036,513. The share by weight of the fibrous carrier material in the electrode is from 20 to 60 percent. Among other things, the carrier material comprises paper or a copolymer of acrylonitrile and methylmethacrylate. The water repellent compound is primarily polytetrafluoroethylene or a styrene-butadiene copolymer. It amounts to 1 to 25 percent by weight of the electrode. The metal catalyst is above all, platinum, palladium or ruthenium. The weight share of the catalyst material in the electrode is 25 to 65 percent. Since, in this known electrode, the catalyst is in the layer of fibrous carrier material, the electrode does not have its own cover layer.

The electrode according to the invention which consists of fibrous material and of catalyst powder has an entirely different make-up. It contains catalyst powder only in one part of the electrode while the other portion contains no catalyst powder and consists only of fibrous material. As a result, the electrode contains a catalyst layer and a clearly defined cover layer, which due to their construction and composition define a unit and cannot be separated from each other. This provides, above all, the aforementioned advantages with respect to operational reliability.

The fibrous material of the electrode according to the invention is preferably asbestos. However, other fibrous materials, such as cellulose and its derivatives or synthetic material, may also be used.

The electrode of the invention is, preferably, produced according to the following method: The catalyst powder is added to a suspension of fibrous material in water. This was homogenized and the water partially removed from the suspension thus obtained to give a homogenous mixture of catalyst powder and fibrous material. An aqueous suspension of fibrous material was then provided on top of the homogenous mixture. Thereafter, the water was removed, the layers pressed together and dried.

In this manner, an electrode which consists of two sequential layer type regions whereof only one contains only fibrous material while the other contains fibrous material and the catalyst powder is provided. It is important that the layer type region which is first prepared is so processed that the water is only partially removed from the respective suspension thus obtaining a moist or wet layer with a super-potent liquid layer. This insures that, following the application of the suspension of fibrous material and the subseqent method steps, an electrode is obtained whose two layer type regions or semi-layers are intimately connected thus forming a unit. In this type of electrode, therefore, the cover layer of pure fibrous material merges gradually into the catalyst layer which contains fibrous material.

The electrode according to the invention may also be produced so that first of all, through a partial removal of the water from the homogenized suspension of pure fibrous material in water, a first layer is prepared consisting of wet web, fibrous material. A homogenized suspension of fibrous material and catalyst powder is applied thereon. Thereafter, the water is completely removed and the still somewhat moist mass is compressed and dried.

In a preferred embodiment of the electrode according to the invention, the catalyst particles in the semilayer comprising fibrous material and catalyst powder are arranged so that their concentration increases as their distance from the region comprising only fibrous material increases. In such an electrode, the region of pure fibrous material which acts as cover layer gradually merges into the catalyst layer, which is penetrated with fibrous material. This concentration distribution of the catalyst powder provides the electrode with particularly good electrical properties.

The method of producing electrodes with this type of distribution of the catalyst powder defines as a first step, always the preparation of a wet or moist homogenous mixture of catalyst powder and fibrous material and as a second step, the application of an aqueous suspension of fibrous material upon this wet mixture. The first step is preferably so effected that the catalyst powder is added to a suspension of fibrous material in water, and the suspension thus obtained is homogenized, and left alone for some time. During this time, the particles of this suspension settle at least partly whereby this sedimentation is so effected that the heavy catalyst particles are preferably precipitated. A complete separation of catalyst powder and fibrous material during sedimentation does not take place, since the catalyst powder adheres partially to the fibrous material.

In this manner a layer is produced which merges from one bottom side with much catalyst powder and little fibrous material continuously into an upper side with little catalyst powder and much fibrous material. After the suspension has precipitated for the larger part which may be recognized by the remaining clear liquid, the water is partially removed. During the second method step, the aqueous suspension of the fibrous material is applied and the process continuous in the afore-described manner.

According to the individual production methods for the electrodes according to the invention, binders are preferably added to the suspension of fibrous material and catalyst powder and/or to the suspension or slurry of fibrous material. The binder may, for example, be of synthetic material. The suspension of fibrous material and catalyst powder may receive an addition of polytetrafluoroethylene, polyethylene or polyglycol. An illustrative suitable addition to the suspension of fibrous material is a butadiene-styrene-acrylonitrile copolymer.

The invention will be described in greater detail hereinbelow with reference to several embodiments and the Drawing, wherein.

The electrodes according to the invention are produced, as follows: 60 mg of fine asbestos fibers were mixed in a glass beaker with 400 ml water, broken with the aid of a vibrator and finely distributed. To this aqueous suspension, 1 g pulverulent Raney nickel was added. The vibration was continued until a homogenous suspension was obtained. This suspension was poured into an appropriate device, e.g. a Büchner funnel with suction bottle or a sheet forming device onto a moistened filter paper. The water was, thereafter, either immediately partially removed by suction head or the suspension was left standing for some time prior to the partial removal of the water until the main amount of the particles becomes deposited on the filter paper. Upon the thus formed water-containing mixture of Raney nickel and asbestos, a suspension of 0.5 g pure asbestos in 100 ml water, finely distributed by a vibrator, was placed. The greater portion of water was removed by suction. Thereafter the still somewhat moist mass was lifted, together with the filter paper, from the filter, covered with a second filter paper and compressed at 10 to 20 kp/cm² pressure, for a short time in a suitable device. Thereafter, drying was effected for about 10 minutes at approximately 60°C and both filter papers were removed from the finished electrode. In the same manner an electrode can be produced that contains, for example, pulverulent Raney silver rather than pulverulent Raney nickel.

Figure 1:
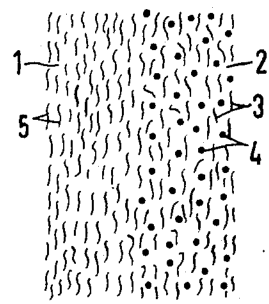
FIG. 1 is a schematic cross section through an electrode according to the invention.

FIG. 1 is a schematic illustration of a cross section through an electrode produced without additional sedimentation effect. In this Figure, the layer type region or semilayer 1 consists only of fibrous material 5, semilayer or region 2, contains, fibrous material 3 and catalyst powder 4.

Figure 2:
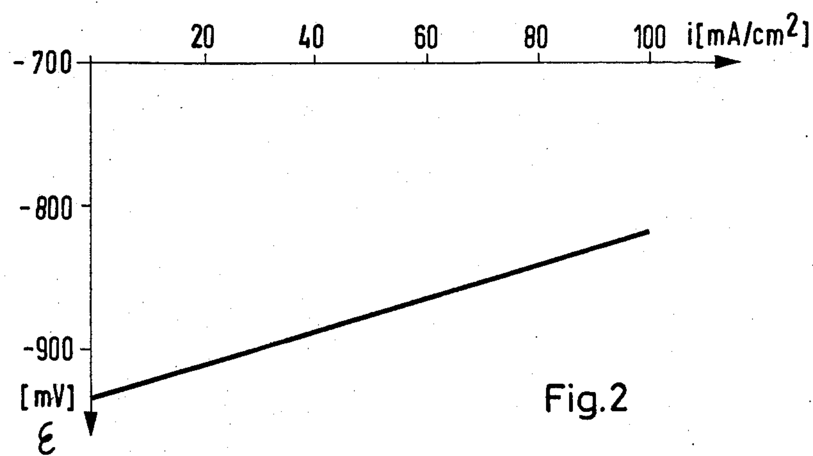
FIGS. 2 and 3 are current voltage curves of two electrodes produced in accordance with the invention.
Figure 3:
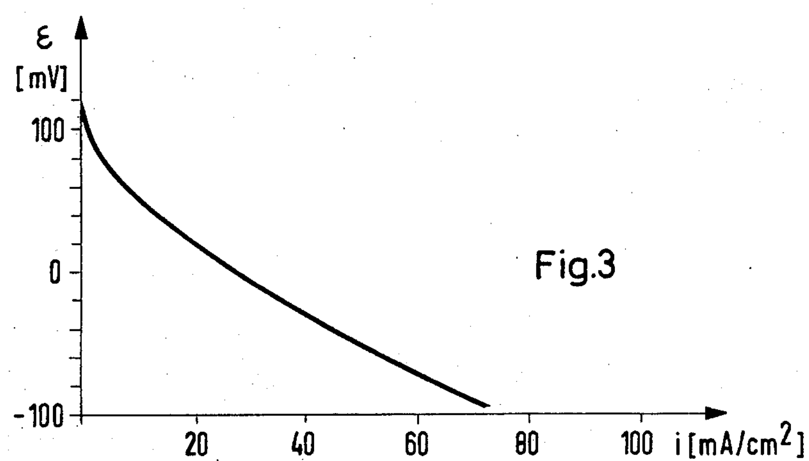

Two current voltage curves which were plotted at thus obtained electrodes are graphically illustrated in FIGS. 2 and 3. Potential $\epsilon$ is plotted on the ordinate in mV and the abscissa shows the current density i plotted in mA/cm². The electrodes are tested in half cell circuit using as the comparison electrode an Hg/HgO reference element. The electrolyte was represented by 6 n KOH, the operational temperature was 23°C, the pressure of the reaction gases (hydrogen, or oxygen) respectively, was 1.5 atm.

FIG. 2 illustrates the current voltage curve of an hydrogen electrode. The electrode had an area of about 12.5 cm² and a thickness of about 0.8 mm. The coating thickness was 100 mg Raney nickel/cm². The catalyst material was tempered at 300°C in a hydrogen current, prior to being utilized.

FIG. 3 illustrates the current voltage curve of an oxygen electrode. The electrode area was about 12.5 cm² while the electrode thickness was about 0.7 mm. The electrode had a coating of 80 mg Raney silver/cm².

As the current voltage curves show, as well as the comparisons conducted with conventional electrodes, i.e. electrodes with cover layers of pure fibrous material and catalyst layer without fibrous material, the presence of fibrous material in the vicinity of the catalyst layer caused no impairment of the electrical behavior of the electrodes according to the invention. This factor is derived also from the experimentally determined cell voltage of a cell whereinto two electrodes, according to the invention, were installed.

The following Table is a compilation of the measured results determined thereby.

TABLE

| Current Density i [mV/cm²] | Potential of Anode $\epsilon$ $H_2$[mV] | Cathode $\epsilon$ $O_2$[mV] | Cell Voltage U [mV] |
|---|---|---|---|
| 0 | −930 | +136 | 1063 |
| 5 | −920 | + 60 | 975 |
| 10 | −912 | + 32 | 940 |

TABLE-Continued

| Current Density i [mV/cm²] | Potential of Anode $\epsilon$ $H_2$[mV] | Cathode $\epsilon$ $O_2$[mV] | Cell Voltage U [mV] |
|---|---|---|---|
| 20 | −895 | − 7 | 887 |
| 30 | −880 | − 36 | 845 |
| 50 | −850 | − 88 | 160 |

These values were obtained under the above-indicated test conditions, the electrodes had the above-indicated dimensions and coating thicknesses.

Figure 4:
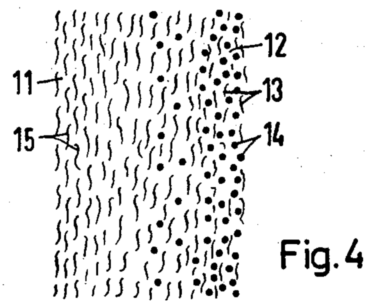
FIG. 4 is a schematic cross section through a preferred embodiment of the electrode according to the invention.

FIG. 4 depicts in schematic illustration a cross section through a preferred embodiment of the electrode according to the invention. In the production of such an electrode, a sedimentation is additionally effected so that within the electrode, the catalyst particles 14 in the layer type region 12, consisting of fibrous material 13 and catalyst powder are increased in concentration as their distance from the region 11, which comprises only fibrous material 15 increase.

I claim:

1. An electrode for electrochemical cells with pulverulent catalyst material and a porous cover layer of fibrous material, the electrode comprising a layer of fibrous material consisting of two sequential semilayers, one of said semilayers comprising fibrous material and being free of catalyst material and the other of said semilayers comprising fibrous material and pulverulent catalyst material, said catalyst material being selected from the group consisting of Raney nickel and Raney silver, the catalyst particles of the semilayer comprising catalyst material and fibrous material increasing in concentration as their distance increases from the semilayer which comprises fibrous material and is free of catalyst material.

2. The electrode of claim 1, wherein the fibrous material is asbestos.

* * * * *